United States Patent [19]

Wells

[11] Patent Number: 4,699,351
[45] Date of Patent: Oct. 13, 1987

[54] PRESSURE RESPONSIVE, PILOT ACTUATED, MODULATING VALVE

[75] Inventor: Robert A. Wells, Huntington, N.Y.

[73] Assignee: Target Rock Corporation, East Farmingdale, N.Y.

[21] Appl. No.: 629,617

[22] Filed: Jul. 11, 1984

[51] Int. Cl.⁴ ............................................. F16K 31/12
[52] U.S. Cl. .................................. 251/29; 251/30.01; 251/36; 251/38; 251/44
[58] Field of Search .................... 251/29, 30, 44, 36, 251/38, 30.01, 30.02, 30.03, 30.04

[56] References Cited

U.S. PATENT DOCUMENTS

| | | | |
|---|---|---|---|
| 931,228 | 8/1909 | Schutte | 251/29 |
| 2,020,833 | 11/1935 | Hansen | 251/39 X |
| 2,575,272 | 11/1951 | Harris | 257/30.04 |
| 2,665,708 | 1/1954 | Ghormley | 137/493 |
| 2,968,464 | 1/1961 | Olson | 251/38 X |
| 3,154,285 | 10/1964 | Houle | 251/38 X |
| 3,799,497 | 3/1974 | Zevner | 251/44 X |
| 4,494,726 | 1/1985 | Kumar et al. | 251/44 X |

FOREIGN PATENT DOCUMENTS

| | | | |
|---|---|---|---|
| 1130235 | 9/1955 | Fed. Rep. of Germany | 251/38 |
| 2158321 | 6/1972 | Fed. Rep. of Germany | 251/38 |
| 2835749 | 2/1979 | Fed. Rep. of Germany | 251/30.04 |
| 2737842 | 3/1979 | Fed. Rep. of Germany | 251/29 |

Primary Examiner—Samuel Scott
Assistant Examiner—H. A. Odar
Attorney, Agent, or Firm—Hoffmann, Dilworth, Barrese & Baron

[57] ABSTRACT

The pressure responsive, pilot actuated, modulating valve comprises a main valve assembly which defines with the housing a first chamber and controls flow of fluid from an inlet port to an outlet port. A pressure responsive piston is provided which defines with the housing a second chamber. A vent passageway is provided in the piston for communicating the second chamber with the outlet port. A pilot valve assembly is provided to control flow through the vent passageway. A means is provided for selectively actuating the pilot valve assembly. A discharge orifice is comprised in the main valve assembly for communicating the vent passageway with the outlet port. A vent valve assembly is disposed to control flow of fluid between the first chamber and the discharge orifice. A restricted conduit means is disposed to coact with the main valve assembly to provide a variable flow area communicating the inlet port with the discharge orifice and the first chamber when the vent valve assembly and the main valve assembly are in an open position and which flow area varies in direct proportion to the amount the main valve assembly is open to thereby vary fluid pressure in the first chamber and provide forces on the main valve assembly which act counter to the direction of movement of the main valve assembly.

15 Claims, 3 Drawing Figures

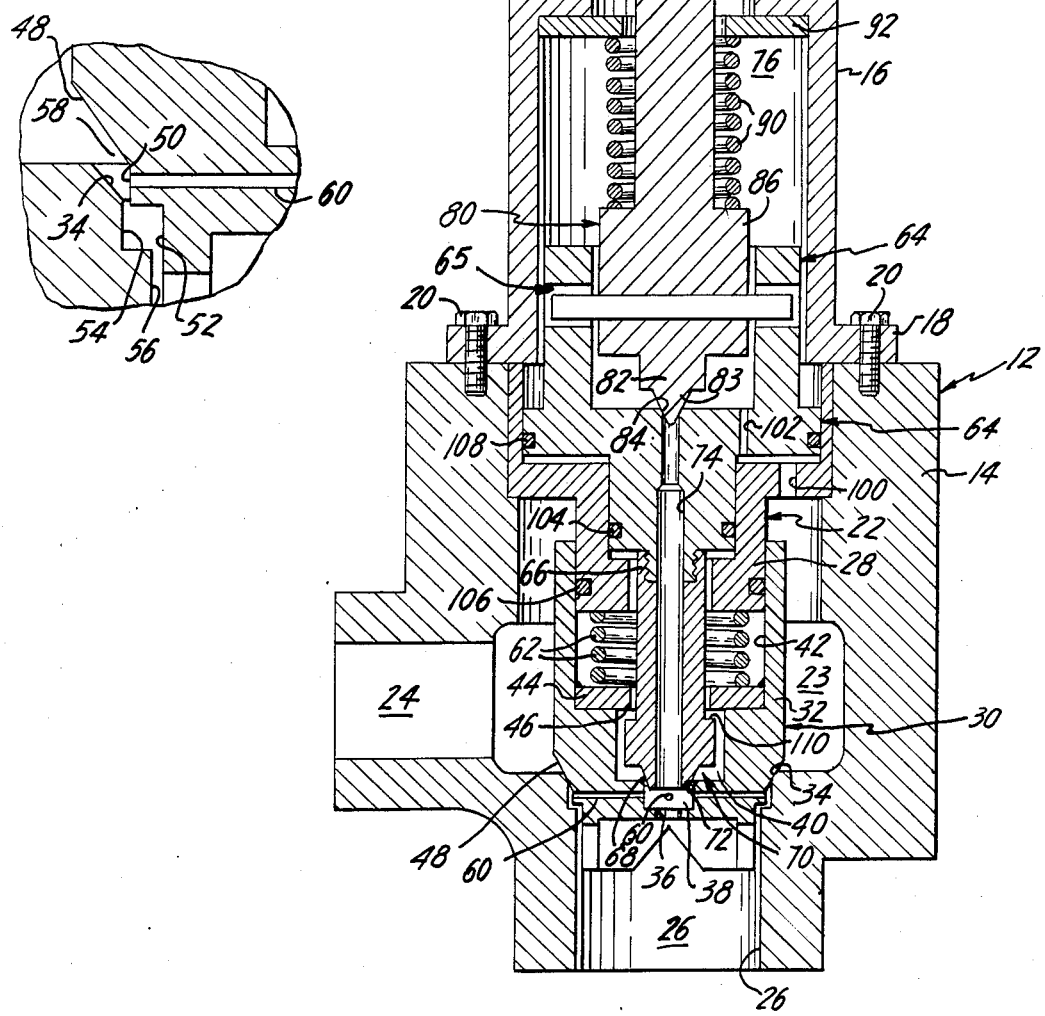
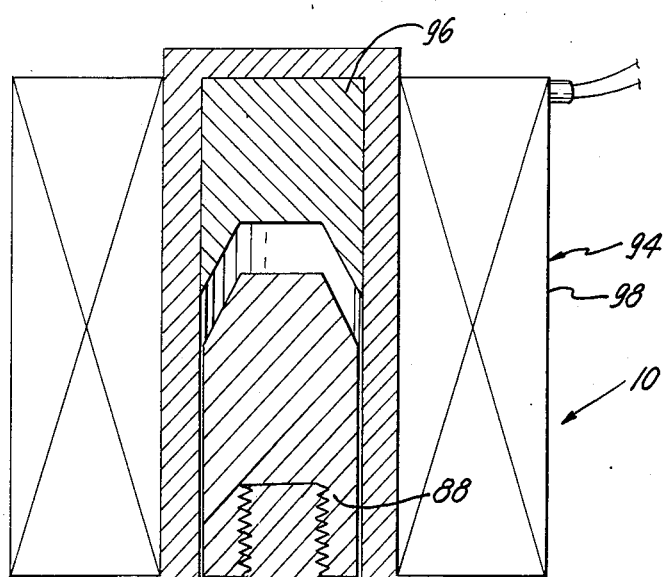

PRESSURE RESPONSIVE, PILOT ACTUATED, MODULATING VALVE

This invention relates to valves and more particularly valves of the pressure responsive, pilot actuated, modulating type.

BACKGROUND OF THE INVENTION

In heretofore known pressure responsive, pilot actuated, modulating valves as exemplified in the U.S. Pat. Nos. to Harris, 2,575,272; Olson 2,968,464 and Keller 3,405,906, wherein a movable main valve element of a main valve assembly is positioned by an actuating element, such as a piston, diaphragm or bellows, which responds to the positioning of a pilot valve assembly by utilizing the force of the pressure in the fluid, the flow of which is to be controlled, there exists the problem of stability of operation. In such valves, the lifting or unseating force must equal the opposing forces for modulation. This balance is upset by the flow forces of the fluid to be controlled, as for example, the flow of liquid, gas or steam, thus causing instability. This stability of valve operation can be achieved to a limited extent by sizing of orifices, pilot valve assembly configuration, increasing dampening and reduction or control chamber volume. Valve operational stability is particularly difficult to achieve where the fluid to be controlled is a gaseous fluid, as for example air or steam.

Accordingly, it is an object of this invention to provide a pressure responsive, pilot actuated, modulating valve which has a higher degree of stability of operation than heretofore known valves of this type.

Another object to the prsent invention is to provide a pressure responsive, pilot actuated, modulating valve in which chattering is minimized.

A still further object of this invention is to provide a pressure responsive, pilot actuated, modulating valve which is of relatively simple and compact construction.

For convenience, valve mechanisms or assemblies will sometimes be identified by reference only to their movable portions or members (e.g. the plug elements) as distinguished from the entire valve assembly consisting of the movable plug element, port and seat. Where reference is intended to encompass the entire assembly, the word "assembly" will be used.

SUMMARY OF THE INVENTION

Now, therefore, the present invention contemplates a novel pressure responsive, pilot actuated, modulating valve comprising a housing having an inlet port connected to receive pressurized fluid and an outlet port connected to a place to which the pressurized fluid is to be conducted. A main valve assembly is disposed in said housing for controlling flow of pressurized fluid from the inlet port to the outlet port. The main valve assembly also defines with said housing a first chamber which varies in volumetric size as the main valve assembly moves between fully open and closed positions. A pressure responsive piston is disposed in the housing to define with the latter a second chamber. A vent passageway is provided in the piston for communicating the second chamber with the outlet port. A pilot valve assembly for controlling fluid flow through the vent passageway is disposed in the housing. A means is provided for selectively actuating the pilot valve assembly. The improvement according to this invention comprises a discharge orifice in the main valve assembly for communicating the vent passageway with the outlet port. Also, provided is a control passageway means for communicating the discharge orifice with the chamber. A vent valve assembly, having a movable valve member carried by the piston, is disposed for controlling flow of fluid between the first chamber and the discharge orifice. Also included in the improvement is a restricted conduit means coacting with the main valve assembly to provide a variable flow area communicating the inlet port with the discharge orifice and the first chamber when the vent valve assembly and main valve assembly are in an open position and which flow area varies in direct proportion to the amount the main valve assembly is in an open position to thereby vary fluid pressure in the first chamber and provide forces on said main valve assembly which act counter to the direction of movement of the main valve assembly. These pressure forces acting on the main valve assembly in opposition to its movement achieves operational stability.

A feature of this invention is the provision of a plurality of passageways in the main valve disc extending radially from the outer peripheral surface of the main valve disc and to the discharge orifice disposed coaxially in the main valve disc. These passageways are located adjacent the associated seat of the main valve disc so that as the valve disc moves relative to its seat, the flow area communicating the inlet port with the radially extending passageways varies proportionately to the distance the main valve disc is from its seat.

BRIEF DESCRIPTION OF THE DRAWINGS

The above and other object and advantages of the present invention will appear more fully hereinafter from a consideration of the detailed description which follows when taken together with the accompanying drawings wherein one embodiment of the invention is illustrated and in which:

FIG. 1 is a longitudinal cross sectional view through the pressure responsive, pilot actuated, modulating valve according to this invention, somewhat schematically illustrated and in the fully closed position;

FIG. 2 is an enlarged fragmentary view of that portion of the main valve assembly within the broken line circle A shown in FIG. 3 but is shown in a more closed position;

DESCRIPTION OF THE PREFERRED EMBODIMENT

Figure 3:
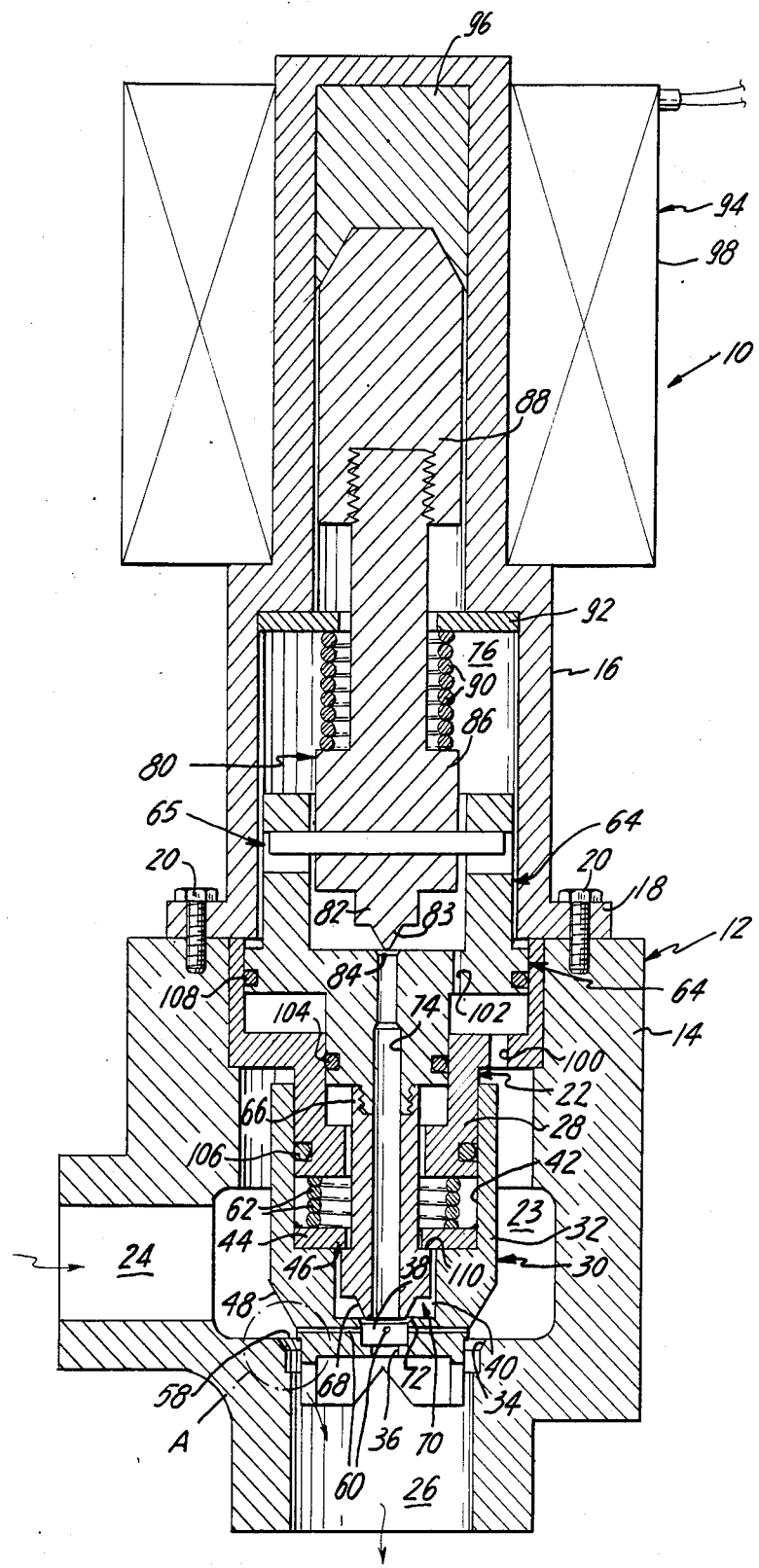
FIG. 3 is a view similar to FIG. 1 showing the valve according to this invention in the fully open position.

Now referring to the drawings and more specifically FIG. 1, the reference number 10 generally designates a pressure responsive, pilot actuated, modulating valve according to this invention. As shown in FIG. 1, valve 10 is in the fully closed position.

HOUSING

The valve 10 comprises a housing 12 which has a body portion 14 and cap portion 16. The cap portion 16 has a flanged end 18 and is secured coaxially to body portion 14 by a plurality of bolts 20 which pass through flanged end 18. The housing also includes a sleeve 22 which is fixedly secured within the interior 23 of body portion 14 between an annular shoulder formed in the interior surface of the body portion and the flanged end 18 of cap portion 16. The body portion 14 has an inlet port 24 and an outlet port 26, each of which communicates with the interior 23 of the body portion. The inlet port 24 is connected by any suitable conduit means (not shown) to a source of pressurized fluid, the flow of which is to be controlled by valve 10. The outlet port 26 is connected by any suitable conduit means (not shown) to a place (not shown) at lower fluid pressure than the pressurized fluid at the inlet port. The sleeve 22 has a reduced diameter end portion 28 which is coaxial with but axially spaced from outlet port 26.

MAIN VALVE

A valve assembly 30 is provided to control the flow of fluid from inlet port 24 through outlet port 26. The main valve assembly 30 comprises a movable member or main valve disc 32 and a seat 34 formed in body portion 14 of housing 12 at the juncture of outlet port 26 and the interior 23 of the body portion.

The main valve disc 32 has an axial bore therethrough, the lower end of which constitutes a discharge orifice 36. The axial bore has three progressively larger counterbored portions from orifice 36. The first counterbored portion forms a manifold 38, while the second counterbored portion forms a vent chamber 40. The third counterbored portion is of such diametral dimension as to slidably receive therein reduced diameter end portion 28 of sleeve 22, the end portion 28 serving to support and guide main valve disc 32 in its reciprocative movement to and away from seat 34. The main valve disc 32 and end portion 28 end the third counterbored portion form a first variable volume chamber 42. A washer 44 is secured in the bottom of the third counterbored portion to form an annular stop shoulder 46, the purpose of which will be fully explained hereinafter. The main valve disc 32 has a beveled, annular surface 48 which is at an angle complementary to seat 34 so that in the fully closed or seated position the valve disc sealingly abuts the annular surface of seat 34. As best shown in FIG. 2, the valve disc 32 also has a stepped, reduced diameter, end portion which forms two peripheral surfaces 50 and 52 which extend in close spaced relationship, respectively, to the annular surfaces 54 and 56 of outlet port 26 formed by a counterbore adjacent seat 34. The adjacent surfaces 50 and 54 and 52 and 56 form a narrow annulus 58 when valve disc 32 is in an unseated position (see FIG. 3). In the unseated position, inlet port 24 is in communication with manifold 38, via the flow area between seat 34 and surface 48 of main valve disc 32, and radially extending, circumferentially spaced passageways 60. To bias main valve disc in a seated or closed position, a return spring 62 may be disposed in vent chamber 42 between the end portion 28 of sleeve 22 and washer 44.

VENT VALVE ASSEMBLY

A piston 64 is disposed for reciprocative movement is sleeve 22 and in chambers 40 and 42 of main valve disc 30. For assembly purposes, piston 64 is shown as comprising an upper portion and a lower portion secured together by a threaded connection 66 into a single unitary member. At the distal end of the lower portion of piston 64, as viewed in FIGS. 1 and 3, there is provided a tapered annular surface which constitutes the movable valve member 68 of a vent valve assembly 70. The vent valve assembly 70 includes a tapered seat 72 (best shown in FIG. 3) which is formed at the juncture of manifold 38 and vent chamber 40 and is complementary to the annular surface of the piston. The upper portion of piston 64 is stepped so that two inner surfaces of sleeve 22 serve as cylinders to guide and support the piston in its reciprocative movement. An axial bore 74 is provided in piston 64 to extend from its lower end in communication with manifold 38 to its upper end in communication with a second variable volume chamber 76 defined by interior of housing 12 and piston 64.

PILOT VALVE ASSEMBLY

A pilot valve assembly 80 is mounted in housing 12 and comprises a movable member 82 having a cone shaped axial projection or tip 83 dimensioned to penetrate the upper end of bore 74 and engage in the closed position a seat 84 formed at the upper end of bore 74. The movable member 82 has an enlarged portion 86 which is connected to piston 64 by a pin and slot interconnection 65 which allows limited relative movement between movable member 82 and piston 64. The enlarged portion 86 is connected to a plunger 88 which is guided in its reciprocative movement by an upper reduced diameter portion of housing 12. The plunger 88 may be made of two pieces for purposes of assembly. A return spring 90 is disposed to abut at one end a washer 92 secured transversally in housing 12 and at the opposite end to enlarged portion 86. The spring 90 functions to bias movable member 82 in a closed or seated position against seat 84.

PILOT ACTUATOR

Actuation of pilot valve assembly 80 may be accomplished, as shown, by a proportional solenoid assembly 94 which is suitably attached to housing 12. The solenoid assembly 94 comprises a fixed core 96 mounted in housing 12 and a coil 98 mounted coaxially around housing 12 adjacent plunger 88 and fixed core 96. It is to be understood that actuation of pilot valve assembly may be provided by electromechanical, hydraulic or pneumatic actuating mechanisms instead of solenoid assembly 94 without departure from the scope and spirit of this invention.

In the closed position of valve 10 as shown in FIG. 1, piston 64 is pressure balanced by an orifice 100 is sleeve 22 and orifice 102 in piston 64. These orifices 100 and 102 bleed pressurized fluid at inlet pressure from inlet port 24 and interior 23 of housing body portion 14 into variable volume chamber 76. Pressurized fluid at inlet pressure also enters variable volume chamber 42 and vent chamber 40 via leakage past piston ring seals 104 and 106 and the clearances between the lower portion of piston 64 and the adjacent surfaces of main valve disc 32, washer 44 and sleeve 22. A third piston ring seal 108 is also carried in piston 64 to seal the interstices between piston 64 and sleeve 22.

OPERATION

In the closed position of valve 10 as shown in FIG. 1, the pressurized fluid, for example a liquid, gas or steam, the flow of which is to be controlled by valve 10, is prevented from flowing from inlet port 24 to and through outlet port 26 by reason of the closed position of main valve assembly 30. With main valve assembly 30, pilot valve assembly 80 and vent valve assembly 70 closed, fluid to be controlled flows from inlet port 24 and interior 23 of housing 12 into piston chamber 76 through orifices 100 and 102 in sleeve 22 and piston 64, respectively. Also chamber 42 and vent chamber 40 are supplied with pressurized fluid at inlet port pressure by reason of leakage past piston ring seals 104 and 106 and the clearances between the piston 64, sleeve 22, movable main valve disc 32 and washer 44. The pressurized fluid in chamber 42 and return spring 62 provide coacting forces to hold main valve disc 32 against its seat 34 at outlet port 26 to thereby prevent flow of pressurized fluid through the outlet port to a place of use (not shown) of such fluid. Since vent valve assembly 70 and pilot valve assembly 80 are exposed on one side to outlet fluid pressure which is lower than inlet fluid pressure and on their respective opposite sides are exposed to fluid pressure at inlet fluid pressure, the pressure differential provides forces urging the respective valve assemblies into a closed position.

When valve 10 is to be actuated to an open position, solenoid coil 98 is energized causing plunger 88 to be drawn upwardly toward core 96 causing the force of spring 90. This plunger movement unseats tip 83 of pliot valve assembly 80 from its seat 84 thus venting chamber 76 to outlet port 26, through bore 74, manifold 38 and discharge orifice 36. This venting of chamber 76 reduces the fluid pressure in the chamber because orifices 100 and 102 are restricted flow passages and thus fluid at inlet port pressure cannot replace the vented fluid at the rate of its discharge through bore 74. The decrease in fluid pressure in chamber 76 to less than the inlet port fluid pressure results in a pressure differential across piston 64 whic produces a force againt the piston in an upward direction as viewed in FIG. 1, thus following the upward movement of plunger 88. The upward movement of piston 64 causes the movable valve member 68 of vent valve assembly 70 to open; that is, to unseat from its associated seat 72. This unseating of vent valve assembly 70 vents chamber 42 and vent chamber 40, through manifold 38 and discharge orifice 36, into outlet port 26 to thus cause the fluid pressure in chamber 42 to decrease. Since the diameter of chamber 42 is equal to or slightly smaller than the diameter of main valve disc 32 at seat 34, the fluid pressure forces, together with the force of return spring 62, function to keep main valve disc 32 in abutment against its seat 34.

As the pressure in chamber 42 decreases, the force tending to move piston 64 upward decreases due to the reduction of the force of fluid pressure acting upwardly against the surface of piston 64 adjacent connection 66. This reduction in upwardly acting forces tends to control or dampen upward movement of piston 64. In addition, upward movement of piston 64 causes a reduction in the flow area as defined by tip 83 and seat 84 of pilot valve assembly 80, which reduced flow area causes the fluid pressure in chamber 76 to increase. This build-up of fluid pressure acting against piston 64 in opposition to its upward movement together with a reduction in fluid pressure forces acting against piston 64 in the same direction as the upward movement of the piston, provides a stabilizing action opposing piston movement. Obviously, additional upward movement of plunger 88 under the force of solenoid assembly 94 will open pilot valve assembly 80 and increase the flow area defined by tip 83 and its associated seat 84, describe.

When piston 64 has been caused to move upwardly, a sufficient distance to compeltely open vent valve aseembly 70 by lifting movable valve member 68 from its seat 72, the smaller shoulder 110 on the lower portion of piston 64 abuts washer 44 secured to main valve disc 32. With piston annular shoulder 110 in abutment against washer 44 and with the further opening of pilot valve assembly 80 and the attendant upward movement of piston 64, main valve disc 32 of main valve assembly 30 is lifted upwardly from its associated seat 34.

The opening of main valve assembly 03 as best shown in FIG. 2 results in fluid, from inlet port 24 and interior 23 of housing 12, to flow into outlet port 26 via the flow area defined by seat 34 and surface 48 of main valve disc 32, the plurality of passageways 60, manifold 38 and discharge orifice 36. The size of the total flow areas of passageways 60 relative to the flow area of discharge orifice 36 is such that the fluid pressure in chamber 42 increases in proportion to the amount main valve disc 32 is away from its seat 34. This increase in fluid pressure in chamber 42 occurs because as main valve disc 32 moves away from its seated position and the more passageways 60 become exposed to inlet port fluid pressure as it moves relative to surface 34, the more inlet port fluid pressure is diverted from flow into outlet port 26 and into chamber 40 past open vent valve assembly 70 and, from chamber 40, into chamber 42. As shown in FIG. 2, the passageways 60 are exposed to receive full inlet fluid pressure. This control of flow of inlet fluid from inlet port 24 to chamber 42 in proportion to the extent of the opening of main valve assembly 30, provides for stabilization of fluid pressure in chamber 42 at a value determined by inlet port fluid pressure, outlet fluid pressure and the relative sizes of the flow areas of passageways 60 and discharge orifice 36.

The surface area of main valve disc 32 formed by the entire inside area of disc 32 minus the flow area of orifice 36 is larger than the surface area of the smaller portion of piston 64 minus the area of pilot seat, adjacent connection 66 and, therefore, increased pressure in chamber 42 which acts on the underside of the aforesaid smaller portion of piston 64 and the internal surface area of main valve disc 32 provides a differential force component acting in opposition to the opening of main valve assembly 30. This force differential also insures that the shoulder 110 of the lower portion of piston 64 maintains abutment against washer 44 and movement of main valve disc 32 with piston 64 as though fixedly secured together.

When solenoid 94 is actuated to move main valve assembly 30 toward a fully closed position from the fully open position shown in FIG. 3, the movement of plunger 88 in a downward direction causes tip 83 of pilot valve assembly 80 to move closer to its associated seat 84. This reduced flow area between tip 83 and seat 84 causes an increase in fluid pressure in chamber 76 and such increased pressure acting on piston 64 causes it and main value disc 32 to move downwardly toward a closed position.

As best seen by reference to FIG. 2, when applied electric current flow to proportional solenoid assembly 94 is reduced, the plugner 88 moves downwardly thus carrying enlarged portion 86 and tip 83 of pilot valve assembly 80 toward a closed or seated position. With the flow area between tip 83 and seat 84 reduced, an increase in fluid pressure occurs in chamber 76 and results in piston 64 and main valve disc 32 to also move downwardly toward a closed position by servo action. As main valve disc 32 of main valve assembly 30 moves toward a closed position and radial passageways 60 begin to enter the seat 34 to form the narrow annulus 58 defined between surface 50 and seat 34, the pressure drop in this throttled area causes a reduction in the field pressure supplied to passageways 60. This dimished fluid pressure results in a decrease in the pressure in the chamber 42 of main valve disc 32. This decrease in fluid pressure in chamber 42 functions in opposition to the downward movement of main valve disc 32 to stabilize the latter's position. Thus, to move main valve disc 32 closer to a closed or seated position, pilot valve assembly 80 must be further actuated toward a closed position to further raise the fluid pressure in chamber 76 and thereby effect further downward movement of piston 64 and main valve disc 32. This, as previously stated, causes an increased throttling at annulus 58 and results in a decrease in fluid pressure in chamber 42. When main valve disc 32 engages its seat 34, the fluid pressure in chamber 42 is reduced to the fluid pressure of outlet port 26. Since the main valve disc 32 internal area exposed to fluid in chamber 42 is equal to or slightly smaller than its surface area beyond seat 34 the differential fluid pressure forces acting on main valve disc 32 aided by the force of spring 62, maintains main valve disc 32 in a lightly seated position against seat 34. At this time, vent valve 70 is still in an open position.

At this operational stage, the continued closing of pilot valve assembly 80 so that tip 83 sealingly contacts seat 84 results in continued downward movement of piston 64 and the seating or closing of vent valve assembly 70. With fluid flow through pilot valve assembly 80, vent valve assembly 70 and main valve assembly 30 stopped, the fluid pressure in chamber 42 and chamber 76 increases to that of the inlet port fluid pressure. The inlet fluid pressure in chambers 42 and 76 bearing on the surface areas of the enlarged portion 86 of plunger 88 and main valve disc 32 relative to outlet fluid pressure bearing on main valve disc 32 and the end of movable valve member 68 of vent valve assembly 70 provides a differential pressure force which maintains the valve assemblies 30, 70 and 80 in the closed position.

In summary, whenever the tip 83 of enlarged portion 86 of pilot valve assembly 80 is moved by proportional solenoid assembly 94 or other suitable actuating mechanism to a new position, the piston 64 and, therefore, main valve disc 32 will also move by servo action to a new position. With any movement of the main valve disc 32 near the seated or closed position where inlet fluid pressure is throttled by the annulus 58, fluid pressure in chamber 42 is changed to oppose the direction of movement of main valve disc 32. This counterforce causes a strong stabilizing effect on valve disc 32 and thus prevent chattering or disc fluttering which is a common problem, particularly where the fluid to be controlled is gas or steam.

It is believed now readily apparent that the present invention provides a pressure responsive, pilot actuated, modulating valve which provides operating stability of the main valve in an open position and eliminates chattering and fluttering of the valve. It is a control valve particularly suited for the control of gaseous fluids.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art. As for example, the inlet and outlet ports can be arranged in axial alignment and the axis of the main valve assembly offset in a "Y" pattern instead as shown in the drawings.

What is claimed is:
1. A pilot operated modulating valve comprising:
 (a) a housing having an inlet port communicating with a source of fluid under pressure and an outlet port communicating with a place at a fluid pressure lower than the fluid pressure at the inlet port;
 (b) a main valve assembly having a movable main disc and a main valve seat in said housing for controlling flow of fluid from said inlet port to said outlet port;
 (c) the movable main disc having a first chamber therein;
 (d) said main disc having a discharge orifice for communicating said first chamber with the outlet port;
 (e) a piston mounted in said main valve assembly and housing for reciprocative movement relative to the movable main disc and the housing, the piston and housing defining therebetween a second chamber;
 (f) a vent valve assembly having a first movable valve member within the main disc and carried by said piston and a first valve seat in the main disc for controlling flow of fluid to and from said first chamber;
 (g) a vent passageway in said piston for communicating said discharge orifice with said second chamber;
 (h) a pilot valve assembly including a second movable valve member carried by the housing and a second valve seat at the vent passageway carried by the piston for controlling flow of fluid from said second chamber through the vent passageway and discharge orifice;
 (i) actuating means connected to said second movable valve member to lift the second valve from the seat by controllable amounts; and
 (j) restrictive conduit means in the said main valve assembly sealed by the main disc from the inlet port when the main disc is seated and exposed to the inlet port when the main disc is lifted from its seat, said restrictive conduit providing a variable flow area communicating the inlet port with said first chamber in direct proportion to the opening of the movable main disc from the associated main valve seat to thereby vary fluid pressure in said first chamber to provide forces acting on the movable main disc counter to the direction of movement of the movable main disc.

2. The apparatus of claim 1 wherein a sleeve is fixed in said housing to coact with the movable main disc and piston to support each of those members in their respective movements.

3. The apparatus of claim 1 wherein a biasing means is provided to urge said second movable valve member of the pilot valve assembly in a direction toward the second valve seat.

4. The apparatus of claim 3 wherein said biasing means is a spring.

5. The apparatus of claim 1 wherein said discharge orifice is located axially of said movable main disc and wherein said restrictive conduit means is a plurality of passageways extending from the peripheral surface of said movable main disc to said first chamber.

6. The apparatus of claim 5 wherein said passageways are located on the downstream side to said main valve seat when the value is closed.

7. The apparatus of claim 1 wherein said piston and said first movable valve member are a unitary structure.

8. The apparatus of claim 1 wherein said piston is of two stepped configuration.

9. The apparatus of claim 1 wherein said inlet port and said outlet port are disposed with their axes at an angle to each other and the main valve assembly, vent valve assembly and the pilot valve assembly are arranged coaxially with respect to said outlet port.

10. The apparatus of claim 1 wherein said piston and movable main disc are constructed and arranged to provide limited relative movement therebetween.

11. The apparatus of claim 1 wherein a biasing means is provided to urge said movable main disc of the main valve assembly in a direction toward the main valve seat.

12. The apparatus of claim 11 wherein said biasing means is a spring disposed in said first chamber.

13. In a pressure responsive pilot actuated, modulating valve comprising a housing having an inlet and an outlet port, a main valve assembly in said housing for controlling flow of fluid from the inlet port to the outlet port, said main valve containing a first chamber, a pressure responsive piston being disposed in the housing, the housing and piston defining a second chamber, a vent passageway in said piston for communicating said second chamber with said outlet port, a pilot valve assembly for controlling fluid flow through said vent passageway and means for selectively actuating the pilot valve assembly, the improvement comprising
 (a) a discharge orifice in said main valve assembly for communicating said vent passageway with said outlet port,
 (b) passageway means for communicating said discharge orifice with said first chamber,
 (c) a vent valve assembly having a movable valve member carried by said piston being disposed for controlling flow of fluid between said first chamber and said discharge orifice; and
 (d) restricted conduit means coacting with said main valve assembly to provide a variable flow area communicating the inlet port with said discharge orifice and the first chamber when the vent valve assembly is fully open with the main valve assembly open and which flow area varies in direct proportion to the amount the main valve assembly is lifted from the said seat to thereby vary fluid pressure in said first chamber and provide forces acting counter to the direction of movement of the main valve assembly.

14. The apparatus of claim 13 wherein said main valve assembly comprises a movable valve disc and a seat formed in the housing and wherein said restrictive conduit means includes a plurality of passageways extending from the outer peripheral surface of the valve disc to the discharge orifice.

15. The apparatus of claim 14 wherein said plurality of passageways at the peripheral surface are adjacent the valve seat.

* * * * *